United States Patent [19]

Hawkins

[11] Patent Number: 5,226,816
[45] Date of Patent: Jul. 13, 1993

[54] SIMULATOR ASSEMBLY

[75] Inventor: Michael J. C. Hawkins, West Sussex, England

[73] Assignee: Rediffusion Simulation Limited, Crawley, England

[21] Appl. No.: 974,329

[22] Filed: Nov. 10, 1992

Related U.S. Application Data

[63] Continuation of Ser. No. 633,366, Nov. 21, 1990, abandoned.

[51] Int. Cl.⁵ .................................................. G09B 9/08
[52] U.S. Cl. .......................................... 434/38; 434/30
[58] Field of Search .................. 434/30, 35, 38, 40, 434/43, 55

[56] References Cited

U.S. PATENT DOCUMENTS

| | | | |
|---|---|---|---|
| 2,883,763 | 4/1959 | Schaper | 434/43 |
| 2,999,322 | 9/1961 | Nemstreet | 434/43 |
| 3,494,052 | 2/1970 | Corlyon | 434/55 |
| 3,718,989 | 3/1973 | McKnight | 434/40 |
| 3,758,714 | 9/1973 | Herndon | 434/43 X |
| 4,164,080 | 8/1979 | Kosydar et al. | 434/38 |
| 4,584,896 | 4/1986 | Letovsky | 434/55 X |
| 4,634,384 | 1/1987 | Neves et al. | 434/40 X |

*Primary Examiner*—Robert P. Swiatek
*Assistant Examiner*—L. Thomas
*Attorney, Agent, or Firm*—Nixon & Vanderhye

[57] ABSTRACT

A method for assembling a simulator in which a visual display system is arranged to display an image for viewing from a predetermined viewing position within a simulated viewing station. The visual display system and viewing station are mounted on a base. The viewing station is fabricated such that the location of the viewing position relative to the viewing station is established. The visual display system is fabricated so that when mounted in a predetermined position on the base the location of the viewing position relative to the base is established. When the viewing station and visual display system are mounted on the base, the visual display system is mounted in the predetermined position, and the viewing station being mounted at a position relative to the base selected such that the eye position of a person sat within the viewing station coincides with the location of the viewing position relative to the base.

8 Claims, 6 Drawing Sheets

SIMULATOR ASSEMBLY

This is a continuation of application Ser. No. 07/633,366, filed Nov. 21, 1990, now abandoned.

The present invention relates to a method for assembling a simulator and a simulator when so assembled.

Flight simulators are widely used for training aircraft pilots. Such simulators display to the trainee pilot an image of a scene through which the pilot guides the simulated aircraft. Each simulator incorporates a mock cockpit which is a replica of the cockpit of the aircraft type to be simulated. Thus the simulator cockpit will vary in size and configuration between one simulator and another in dependence upon the aircraft type to be simulated.

Flight simulators incorporate visual display systems which fall into one of two broad categories. The first category is one in which the trainee pilot views an image displayed on a back projection screen through a large mirror positioned in front of the mock cockpit. The mirror is typically in the form of a silvered sheet of plastics material secured to an arcuate semi-circular frame and tensioned by partially evacuating an enclosure defined behind the sheet. Alternatively the mirror may be in the form of rigid components of glass or plastics materials. Such mirrors have heights of the order of six feet and diameters of the order of twenty feet. The second category is one in which television monitors are placed above each window of the mock cockpit and viewed from within the cockpit through beam splitting optical systems located in front of the mock cockpit windows. Systems of the first category produce the most realistic simulators, but systems of the second category produce acceptable results in some applications. In both cases the visual display systems represent a large proportion of the total volume of the simulator.

In the case of both system categories, but particularly in the case of the first system category, the visual display systems must be carefully positioned relative to the mock cockpit so that the trainee pilot is located at an appropriate position to view the displayed image. The mock cockpit and the visual display system are mounted on a frame or platform supported on a motion system generally defined by six substantial hydraulic rams. Given that the frame can be subjected in substantial accelerations during use it is essential that the visual display system is sufficiently dimensionally stable to maintain its shape during such accelerations.

The conventional approach to simulator design has been to fabricate a frame of standard form suitable for a wide range of aircraft types. The mock cockpit is then fabricated and mounted on the frame. Thereafter the visual system is mounted on the frame in a position appropriate to deliver the desired image to a trainee pilot seated in the mock cockpit. Thus, conventionally the visual display system mounting geometry has been tailored to the geometry of the assembled frame and cockpit. Once a first simulator for a particular aircraft type has been produced, further versions of the same simulator can be built on the basis of the knowledge gained from the first. Unfortunately, as different aircraft types have different cockpit configurations and sizes, every time a simulator is built for a new aircraft type the configuration of the visual display system and its mounting on the motion platform frame must be matched to the mock cockpits size and position. This prevents the use of a common design of visual display system, substantially increasing the cost of components and increasing the time taken to fabricate simulators.

A further problem resulting from the conventional approach to simulator fabrication is that cladding components used to enclose the visual display system of the simulator must be tailored to fit both the base which is of standard form and the visual display system which is aircraft-type specific. Given the size of the visual display systems, large cladding components in the form of moulded panels must be produced. Such panels are expensive to produce in small numbers. Furthermore the panels must be readily removable to enable servicing of the components that they cover and it is difficult to achieve the required panel rigidity and security against accidental displacement. Thus, considerable effort must be expended each time a simulator for a new aircraft type is to be manufactured to produce reliable mechanical fixings for the panels. As a result, simulators have been provided generally with very simple box-like enclosures which are not visually appealing and give the simulator an unfinished appearance.

Although the problems outlined above have been explained in the context of flight simulators, similar problems can arise in other types of simulator where the disposition of the visual display system relative to a base of the simulator is dependent upon variations in the position and size of a viewing station, that is the structure within which the trainee personnel are positioned.

It is an object of the present invention to obviate or mitigate the problems outlined above.

According to the present invention there is provided a method for assembling a simulator in which a visual display system is arranged to display an image for viewing from a predetermined viewing position within a simulated viewing station, the visual display system and viewing station being mounted on a base, wherein the viewing station is fabricated such that the location of the viewing position relative to the viewing station is established. The visual display system is fabricated so that when mounted in a predetermined position on the base the location of the viewing position relative to the base is established, and the viewing station and visual display system are mounted on the base, the visual display system being mounted in the said predetermined position, and the viewing station being mounted at a position relative to the base selected such that the said location of the viewing position relative to the viewing station coincides with the said location of the viewing position relative to the base.

The viewing station may be mounted on at least one interface floor that is secured above the base. There may be for example two interface floors arranged one on each side of the viewing station. The or each interface floor may be secured to the base by studs connected to an interface frame assembly located beneath the interface floor. Each stud may be threaded and connected to the base such that rotation of a nut on the stud enables the interface floor to be moved vertically relative to the base.

In a flight simulator, the viewing station will be a mock aircraft cockpit. The cockpit can be fabricated at the same time as the base and visual display system for subsequent assembly. Standard components can thus be used for all the sub-assemblies such as the visual display system which are not aircraft type specific.

Embodiments of the present invention will now be described, by way of example, with reference to the accompanying drawings, in which.

Figures 1, 2, 3, 4:
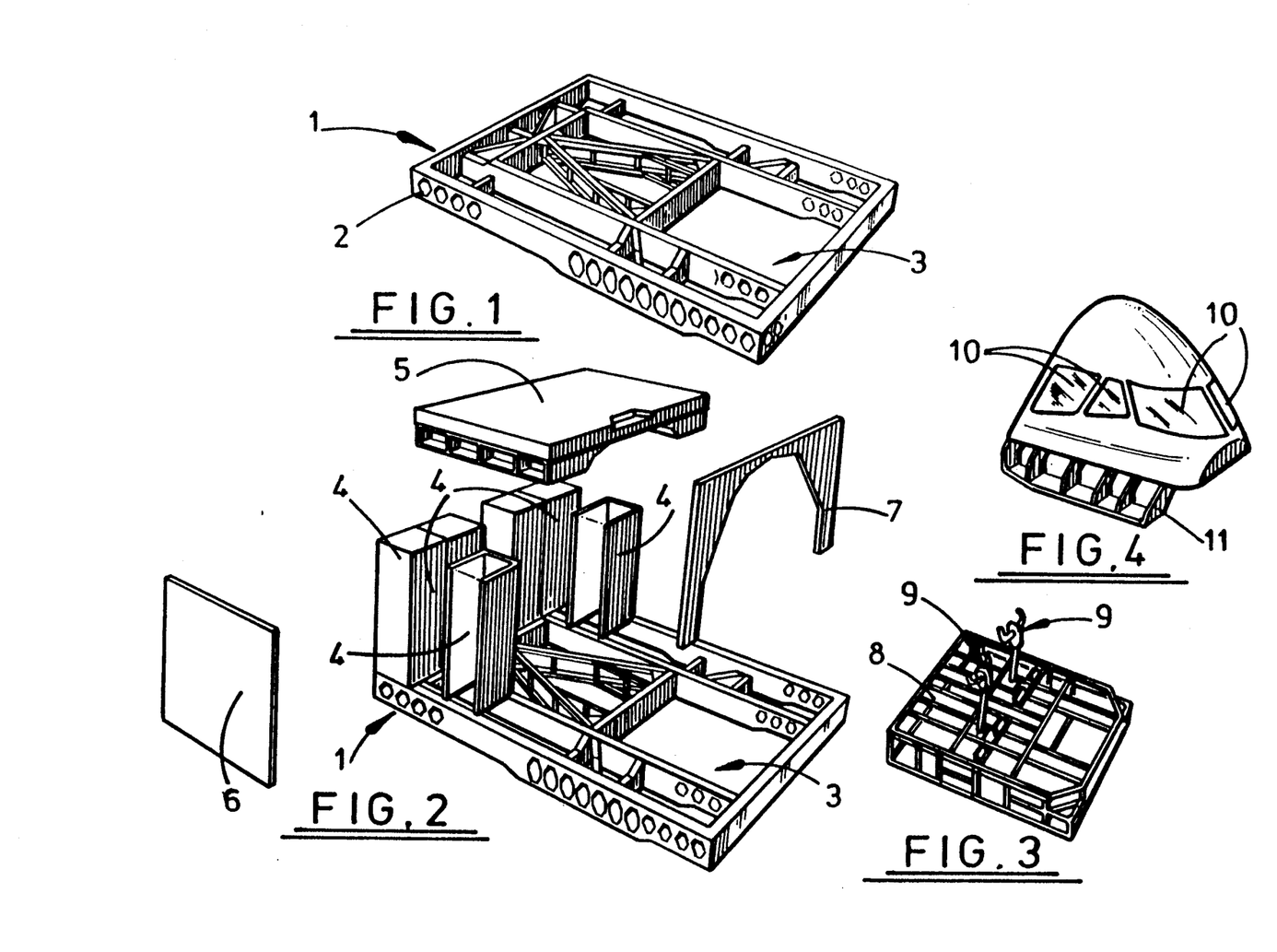
FIG. 1 is a perspective view of a motion platform frame for a flight simulator.
FIG. 2 is an exploded view of the frame of FIG. 1 and ancillary components which are mounted on that frame.
FIG. 3 is a perspective view of a control loading frame which is aircraft-type specific and which in the assembled simulator is mounted within an aperture defined by the frame illustrated in FIG. 1.
FIG. 4 is a perspective view of a mock cockpit to be mounted on the frame of FIG. 1.

Referring to FIGS. 1 and 2, the simulator comprises a space frame or base 1 fabricated from steel girders in which apertures 2 are formed to reduce the overall frame weight. The frame 1 defines a rectangular aperture 3 which in the finally assembled simulator is located beneath the front end of the mock cockpit. Cabinets 4 are supported on the frame 1 so as to provide accommodation for, for example, onboard computers and equipment used by an instructor who sits behind trainee pilots on the simulator. A room assembly 5, side wall 6 and front wall 7 together define a cab which in the assembled simulator is located behind the mock cockpit. The interior of the mock cockpit is of course accessible from within this box-like cab structure.

FIG. 3 illustrates a control loading frame 8 which in the assembled simulator is mounted within the opening 3. The control loading frame supports columns 9 which in use of the simulator are manipulated by trainee pilots. The control loading frame of FIG. 3 is a separately manufactured sub-assembly which is specific to the aircraft type to be simulated.

FIG. 4 is an external view of a mock cockpit which is provided with windows 10 through which trainee pilots look out and is supported on a framework 11. The mock cockpit of FIG. 4 is of course specific to the aircraft type to be simulated. The mock cockpit is mounted above the control loading frame of FIG. 3 so that the control columns 9 are appropriately positioned relative to that cockpit.

Figure 5:
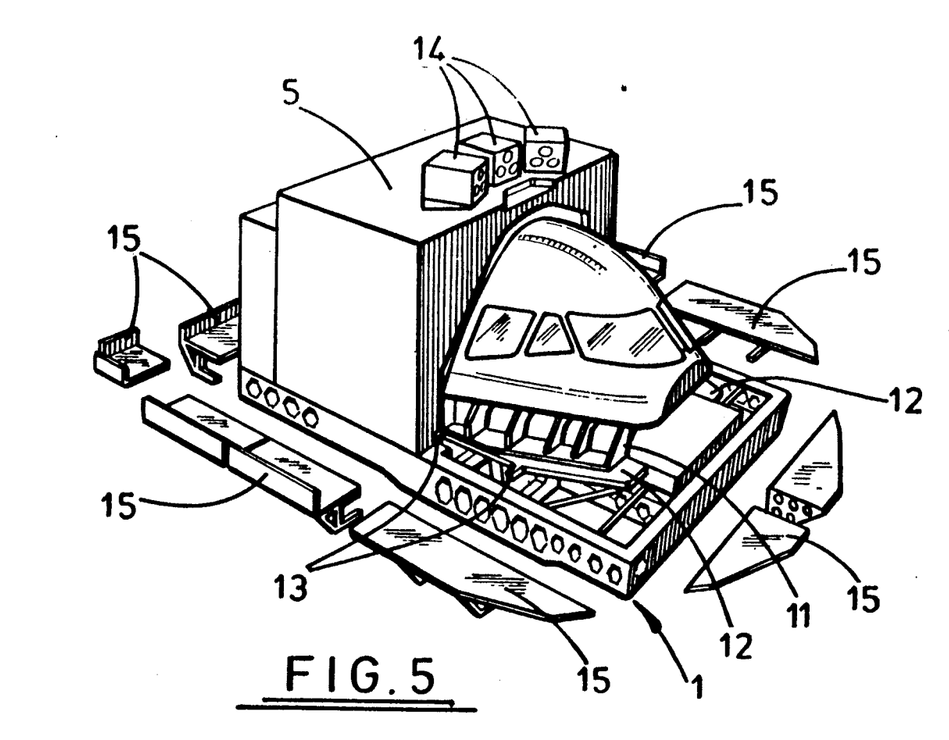
FIG. 5 is a partially exploded view of the simulator after mounting of the mock cockpit of FIG. 4 on the frame of FIG. 1.

FIG. 5 is a partially exploded view of the simulator after the mock cockpit has been mounted on the frame 1. The framework 11 on each side of the mock cockpit rests on an interface floor 12, the interface frame floors 12 being disposed on opposite sides of a floor panel that covers the control loading frame 8 of FIG. 3. Each of the interface floors 12 is supported on eight screw jacks 13 only two of which are shown in FIG. 5. The disposition of the jacks 13 is described in more detail below. Three optical projectors 14 are positioned on the roof panel 5 above and behind the intended sitting position of trained pilots within the mock cockpit. Cladding support structures 15 are arranged around the periphery of the frame 1.

Figure 6:
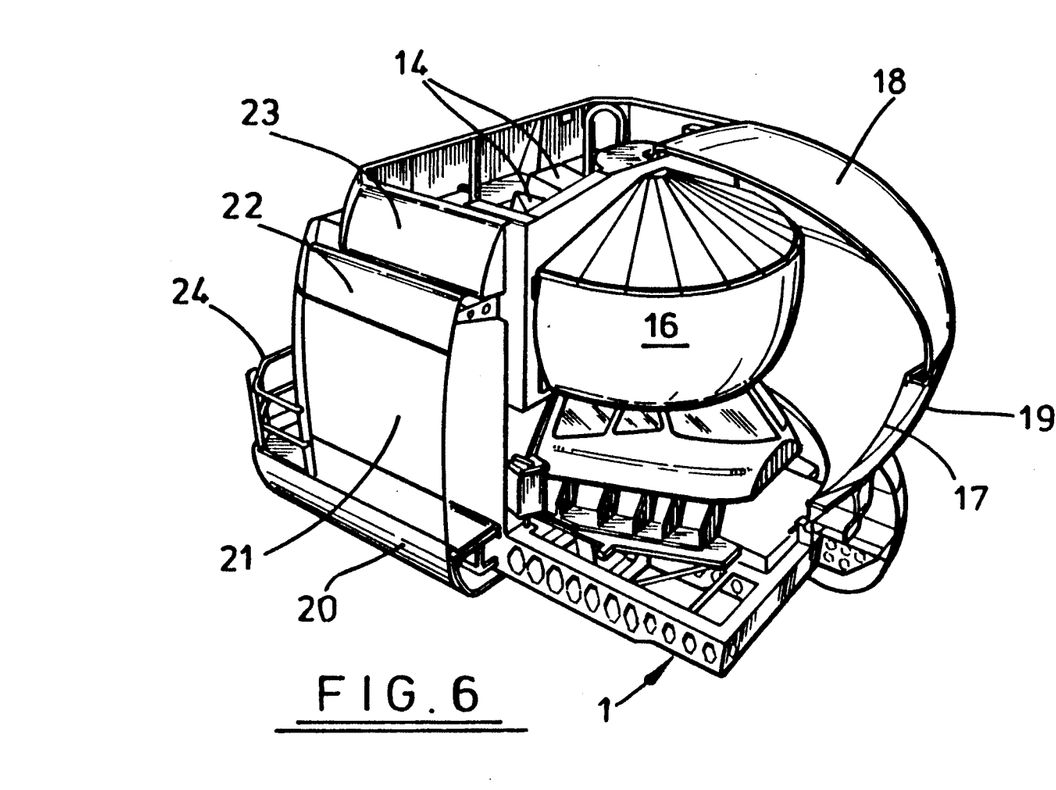
FIG. 6 is a partially cut-away view of a complete flight simulator assembled from the components shown in FIG. 5, a back projection screen, a spherical mirror and cladding panels.

FIG. 6 shows the assembly of FIG. 5 after a visual display system has been installed. The visual display system comprises an optical system including a back projection screen 16 onto which an image is projected by the projectors 14, i.e., light projecting means. Each projector illuminates approximately one-third of the back projection screen 16. The optical system also includes a mirror supported in front of the mock cockpit in a domed structure having upper portions 18 and side portions 19. The mirror 17 is in the form of a silvered plastics sheet which is secured to the domed structure around its periphery and tensioned by partially evacuating an airtight enclosure defined between the mirror 17 and the domed portion 19. A trainee pilot sat within the mock cockpit and viewing parallel to the plane defined by the simulator frame sees a reflection of the image displayed on the back projection 16 in the mirror 17.

The smooth lines defined by the dome portions 18 and 19 are continued around the side of the simulator structure as a result of the provision of cladding panels 20, 21 22 and 23. A walkway is provided at the rear of the simulator with a safety rail 24 extending therearound. The result is a final product with smooth visually appealing lines with all the components designed to meet the requirements of rigidity, light weight and accessibility for serving and repair.

The design of the various components making up the simulator illustrated in FIG. 6 clearly requires the investment of considerable engineering and financial resources. If the design was applicable only to one aircraft type, such investment could not be justified. In accordance with the present invention however the mounting of the mock cockpit on the interface frame floor 12 makes it possible to use a single standard design for all of the non-aircraft type specific components to which any aircraft type specific component can be fitted. Thus in the case illustrated in FIG. 6 the only sub-assemblies which are aircraft-type specific are the control loading frame shown in FIG. 3, and the mock cockpit shown in FIG. 4. Details of components which support the mock cockpit of FIG. 4 on the frame of FIG. 1 are described below with reference to FIGS. 7 to 12.

Figure 7:
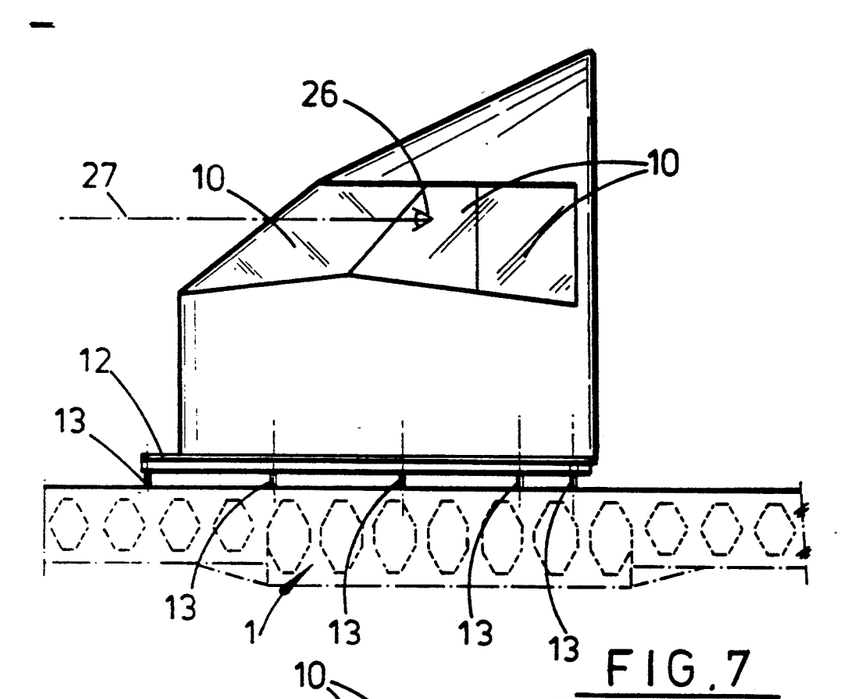
FIG. 7 is a schematic side view of the mock cockpit shown in FIG. 6 mounted on the frame of FIG. 1.
Figure 8:
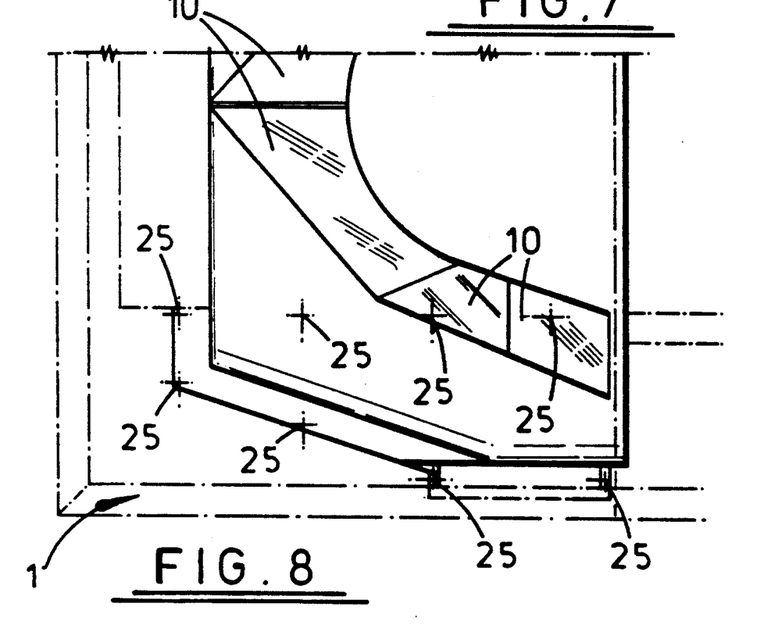
FIG. 8 is a schematic plan view of part of the mock cockpit shown in FIG. 7.

Referring to FIG. 7, this is a schematic side view of the mock cockpit, the frame 1, the interface frame floor 12 and the support jacks 13. Eight support jacks 13 are provided beneath each interface floor 12. The disposition of these eight support jacks is indicated by the crosses 23 in FIG. 8. The outer section of the frame 1 is indicated in dotted lines as is the position of floor panel which is located between the two interface frame floors 12 and covers the control loading frame.

FIG. 7 indicates the intended eye position of a trainee pilot within the mock cockpit by the eye symbol 26. The intended straight line viewing direction is indicated by line 27. The eye position 26 and the viewing direction 27 relative to the mock cockpit are determined by the manufacturers of the aircraft type to be simulated. Thus, when a decision is taken to build a simulator for a new aircraft type, a full specification of the mock cockpit and of the viewing position 26 relative to that cockpit is available from the aircraft manufacturer.

Manufacture of the mock cockpit can thus proceed without reference to any constraints imposed by the design of the remaining components of the simulator providing of course that the mock cockpit can fit within the simulator structure. The other components of the simulator structure, that is the frame 1, the mirror 17, the back projection 16 and other ancillary equipment can also be manufactured without reference to the detailed design of the mock cockpit. It is thus not necessary to defer final design of the visual display system pending completion of the mock cockpit.

Once the mock cockpit has been completed, it is mounted on the frame as shown in FIG. 5 and the support jacks 13 are then adjusted such that the viewing position 26 (FIG. 7) coincides with the appropriate viewing position for the visual system. It will of course be appreciated that the appropriate viewing position for the visual system will always be the same. Thus providing the mock cockpit is initially positioned with the eye position 26 at an appropriate distance from the mirror the mock cockpit can then be adjusted vertically so that the eye position 26 coincides with the ideal eye position defined by the configuration of the visual system. The result of this approach to simulator fabrication is large economies scale in terms of the components which are non-aircraft type specific and reduced lead times given that the visual system and the mock cockpit can be fabricated simultaneously as it is known that final assembly of the two basic components is a matter of relatively simple final adjustment to the position of the mock cockpit.

It will be appreciated that once a simulator has been fabricated for a particular aircraft type, it is then possible to simply duplicate all of the components for subsequent simulators for the same aircraft type. Thus, in many cases, it will be possible to support the mock cockpit on non-adjustable support devices. As a practical matter, however, it is probable that in most cases adjustable support jacks of the type described will always be used.

Figure 9:
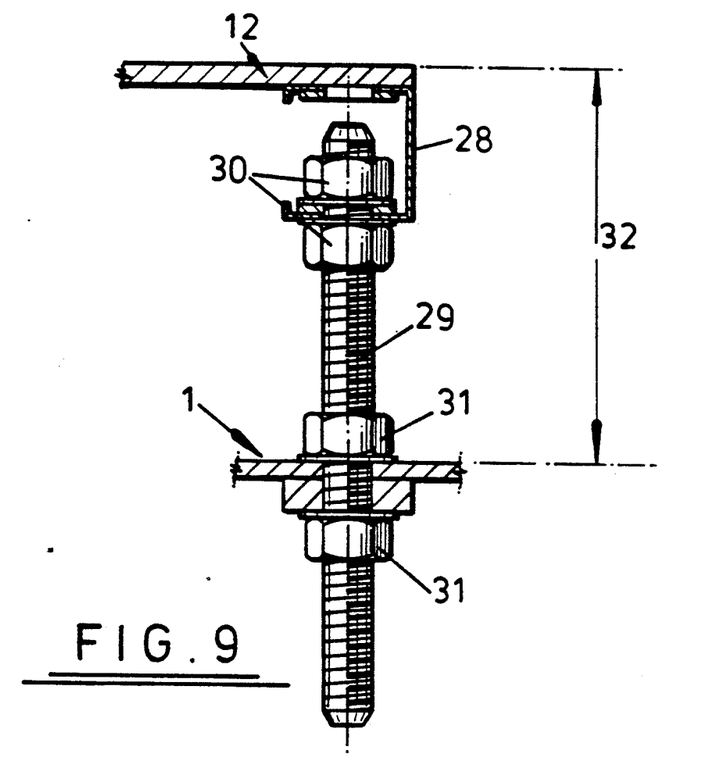
FIG. 9 illustrates a mounting bracket suitable for securing a mock cockpit to the platform of FIG. 1.

Referring now to FIG. 9, this illustrates the detail of one possible support jack of the type indicated by numeral 13 in FIG. 5. The interface floor 12 is mounted on a top surface of an interface frame 28 which is secured to an upper portion of a threaded stud 29 between nuts 30. The stud 29 extends through the top surface of the frame 1 and is secured in a predetermined vertical position relative to the frame 1 by nuts 31. Vertical adjustment of the length of the stud 29 projecting below the top surface of the frame 1 enables adjustment of the dimension 32. Such an arrangement has been used in simulators for the following aircraft type to provide the variations in the dimension 32 set out below:

| Aircraft Type | Dimension 32 |
| --- | --- |
| B747 | 7.94 cm |
| B737 | 7.02 cm |
| B757 | 6.52 cm |
| B767 | 6.56 cm |
| A320 | 7.76 cm |
| A300 | 7.17 cm |

Thus, the simple expedient of the use of a jacking system of the type illustrated in FIG. 9 enables a single simulator enclosure design to fit mock cockpits suitable for six different aircraft types. In all cases, providing care is taken in the design of the mock cockpit to ensure that the dimension 32 is positive, the appropriate value of the dimension 32 can be determined after the mock cockpit has been positioned on the frame 1.

Figure 10:
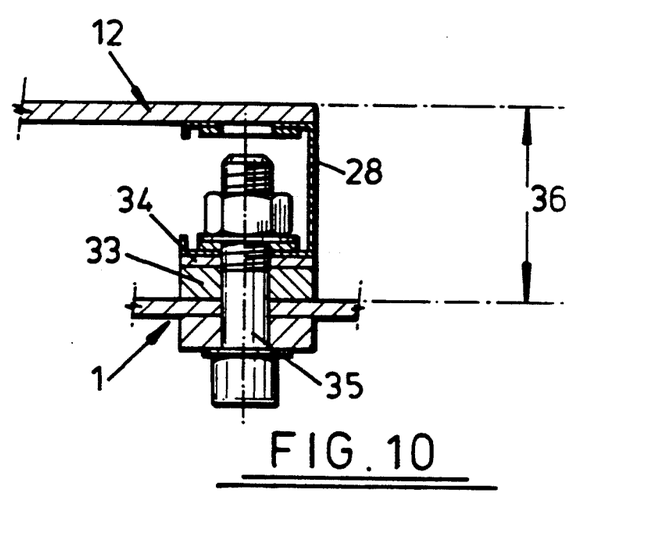
FIG. 10 illustrates an alternative mounting bracket assembly to that of FIG. 9.

FIG. 10 illustrates an alternative to the simple screw jacking arrangement of FIG. 9. In FIG. 10 the interface floor 12 is supported on an interface frame 28 which is mounted on the top face of the frame 1. A spacer 33 and shim 34 determine the spacing between the underside of the frame 28 and the stop face of the frame 1 to which the frame 28 is secured by a stud 35. In use, the mock cockpit is mounted on the frame 1 and elevated to an appropriate height using wedges (not shown). Dimension 36 indicates the spacing between the floor 12 and frame 1 which is adjusted to match the mock cockpit position to the display system position. Once the dimensions 36 have been adjusted as necessary using the wedges an appropriate spacer 33 and shim 34 are inserted so that the frame 28 can be permanently secured in the appropriate position. An arrangement of the type illustrated in FIG. 10 has been used with the following aircraft types to achieve the associated values of the dimension 36:

| Aircraft Type | Dimension 36 |
| --- | --- |
| MD-82 | 2.72 cm |
| MD-11 | 3.20 cm |

Figures 11, 12:
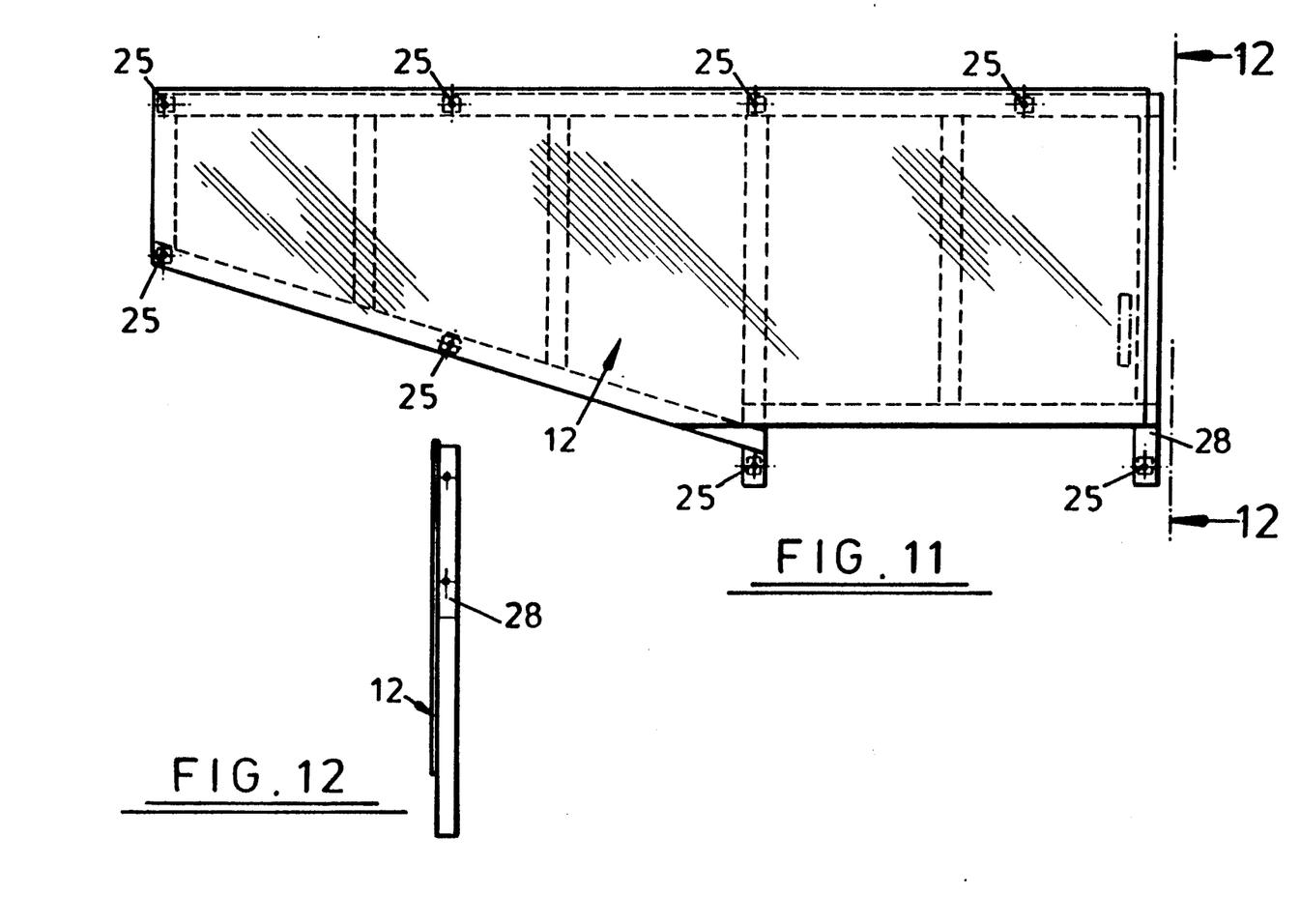
FIG. 11 is a plan view of an interface floor and frame assembly.
FIG. 12 is an end view of the assembly of FIG. 11 taken on the lines 12—12.

FIGS. 11 and 12 illustrate the detailed structure of the interface floor 12 and the underlying frame 28. Reference numerals 25 again show the location of the devices which secure the interface floor and frame assembly to the underlying frame 1 of the simulator.

I claim:

1. A method for assembling a simulator prior to its use, the simulator being intended to present a visual image to a user, comprising the steps of:
    (a) manufacturing a base for the simulator;
    (b) fixedly mounting a light projecting means on the base;
    (c) fixedly mounting an optical system on the base to form the said image from light projected by the projecting means and thereby establishing an ideal viewing position relative to said optical system;
    (d) adjustably mounting on the base a viewing station defining a predetermined viewing position relative to said viewing station and from which the image is to be viewed; and
    (e) selectively adjusting the position of the viewing station relative to the base to displace the location of said predetermined viewing position relative to said light projecting means and said optical system to obtain substantial coincidence of said predetermined viewing position and said ideal viewing position.

2. A method according to claim 1, wherein the viewing station is assembled on at least one interface floor, said interface floor being supported on adjusting means mounted on the base.

3. A method according to claim 2, wherein the viewing station is supported on two interface floors each independently mounted on the base.

4. A method according to claim 1, wherein the base is mounted on a motion system.

5. A simulator arranged to present a visual image to a user of the simulator, comprising:
    (a) a base;

(b) a light projecting means fixedly mounted on the base;

(c) an optical system fixedly mounted on the base for forming an image from light projected by the projecting means, thereby establishing an ideal viewing position relative to said optical system;

(d) a viewing station adjustably mounted on the base, the viewing station defining within it a predetermined viewing position relative to said viewing station from which the said image is to be viewed; and (e) means for selectively adjusting the position of the viewing station relative to the base prior to use of the simulator to displace the location of said predetermined viewing position relative to said light projecting means and said optical system to obtain substantial coincidence of said predetermined viewing position and said ideal viewing position.

6. A simulator according to claim 5, wherein the said viewing station is mounted on at least one interface floor, said interface floor being supported on adjusting means mounted on the base.

7. A simulator according to claim 6, comprising two interface floors each independently mounted on the base.

8. A simulator according to claim 7, wherein the base is mounted on a motion system.

* * * * *